United States Patent [19]
Montague

[11] Patent Number: 6,149,358
[45] Date of Patent: Nov. 21, 2000

[54] APPARATUS FOR RELEASABLY CLAMPING WORKPIECES

[76] Inventor: James M. Montague, 11533 Liberty St., Clio, Mich. 48420

[21] Appl. No.: 09/326,343

[22] Filed: Jun. 4, 1999

[51] Int. Cl.[7] .............................. B23Q 3/00; B25B 5/10; B23B 31/00
[52] U.S. Cl. .......................... 409/225; 269/155; 269/902; 409/219
[58] Field of Search .................... 409/219, 225, 409/234; 269/155, 156, 154, 104, 105, 241, 292, 287, 296, 208, 902; 403/362; 408/107, 103; 279/44, 18, 67, 137, 43

[56] References Cited

U.S. PATENT DOCUMENTS

| | | |
|---|---|---|
| 2,704,671 | 3/1955 | Abramoska et al. ............... 409/225 X |
| 2,995,989 | 8/1961 | Leboime . |
| 3,200,711 | 8/1965 | Rogg . |
| 3,211,445 | 10/1965 | Rossman . |
| 3,398,608 | 8/1968 | Redmer ............................... 409/225 X |
| 3,632,122 | 1/1972 | Sessody . |
| 3,751,027 | 8/1973 | Giles . |
| 3,751,052 | 8/1973 | Derbyshire . |
| 3,791,661 | 2/1974 | Giles . |
| 3,880,046 | 4/1975 | Sessody . |
| 4,151,984 | 5/1979 | Zapary ............................... 269/902 X |
| 4,153,239 | 5/1979 | La Rocco ............................... 269/287 |
| 4,611,960 | 9/1986 | Queenville et al. ..................... 269/241 |
| 4,898,238 | 2/1990 | Grantom ............................. 269/208 X |
| 5,619,818 | 4/1997 | Frederiksen ...................... 269/254 RY |
| 6,062,554 | 5/2000 | Leonard ................................. 269/902 |

*Primary Examiner*—William Briggs
*Attorney, Agent, or Firm*—Reising, Ethington, Barnes, Kisselle, Learman & McCulloch, P.C.

[57] ABSTRACT

Apparatus for supporting a selected number of workpieces at a machining center, each workpiece support having a sleeve within which is reciprocably accommodated a workpiece bearing member cooperable with the sleeve to clamp and unclamp a workpiece in a selected position for machining. The workpiece may be clamped axially or transversely of the sleeve and, when clamped transversely, in a position selectively normal or inclined to the axis of reciprocation.

31 Claims, 2 Drawing Sheets

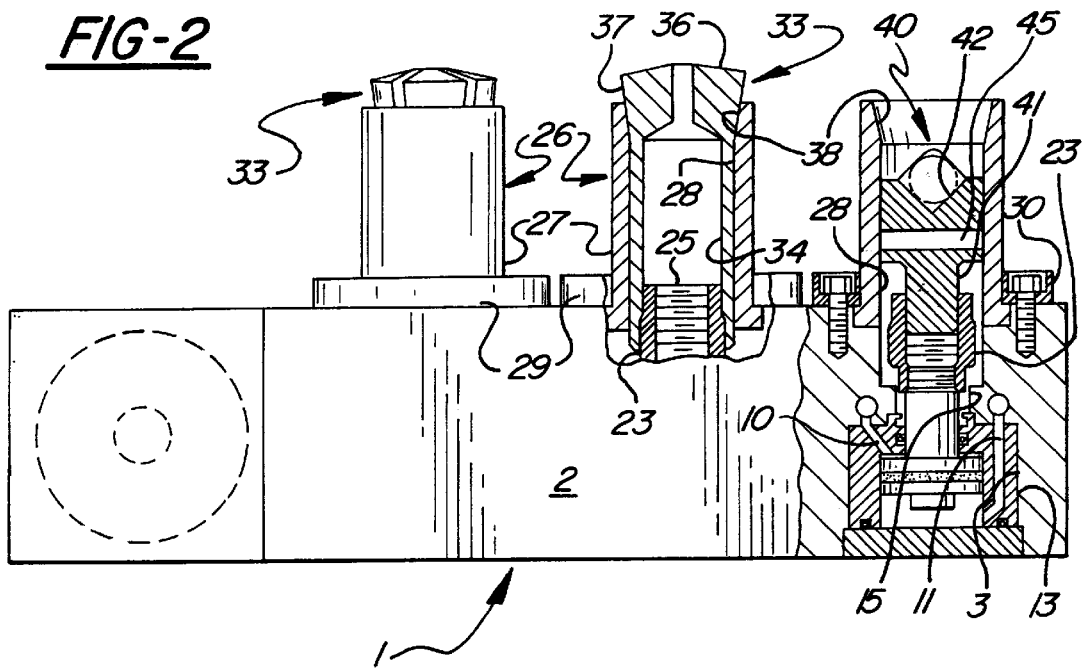
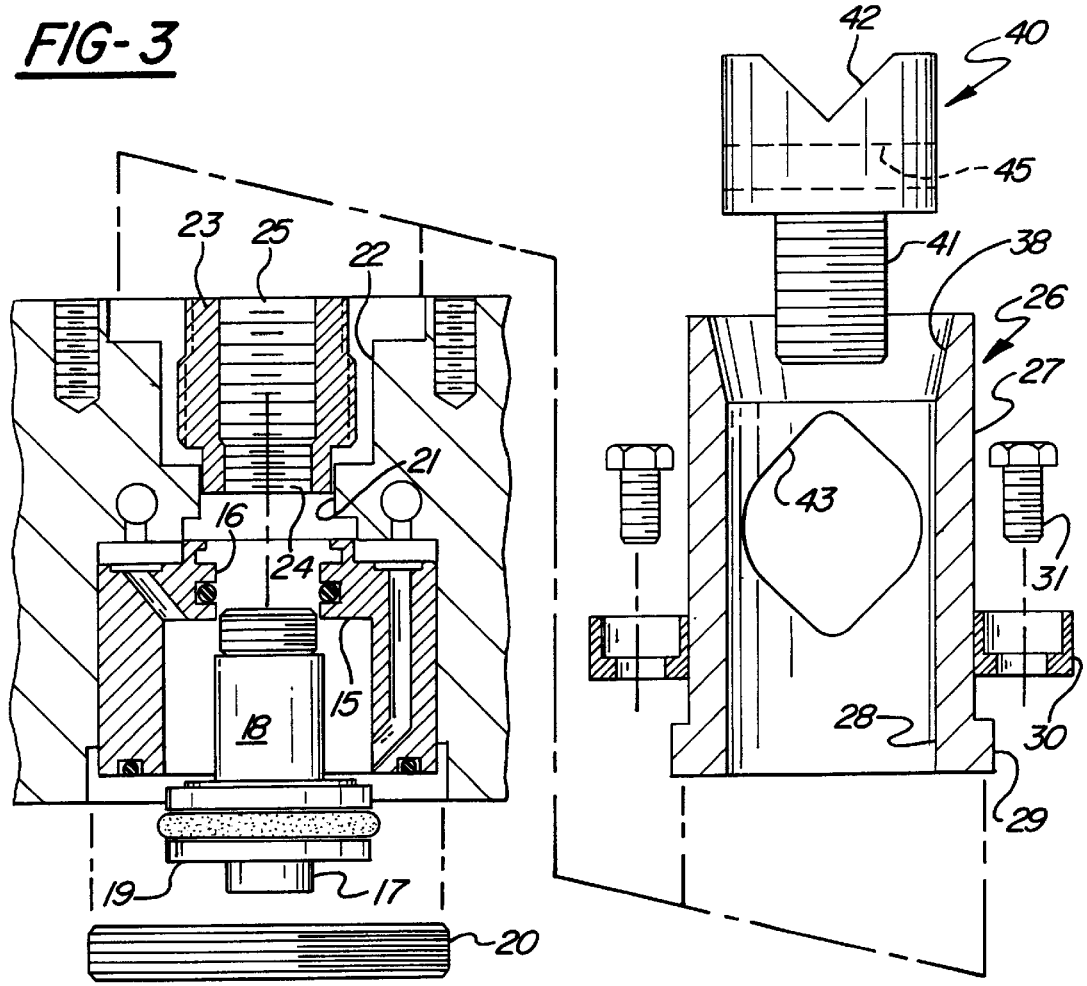

APPARATUS FOR RELEASABLY CLAMPING WORKPIECES

This invention relates to apparatus for releasably clamping one or more workpieces on a base which may be removably mounted in such position as to enable one or more machine tools to perform a desired operation on each workpiece.

BACKGROUND OF THE INVENTION

It has been common heretofore to provide a base or other fixture which mounts one or more workpiece supports at a machining center, for example, in which a plurality of workpieces may be acted upon simultaneously or sequentially by appropriate machine tools. The workpiece supports conventionally comprise vises, collets, over-center clamps, custom fixtures or a combination thereof. Each of these supports has some drawbacks. For example, vises are bulky and frequently require costly, custom manufactured jaws. Further, some vises are not convenient for holding multiple workpieces at a single machining center. Conventional collets are limited in the sizes of workpieces they can accommodate, thereby requiring a plurality of different size collets to accommodate workpieces of different size. In addition, the length of a workpiece that can be accommodated in a collet often is limited to approximately the length of the collet itself.

Over-center clamping devices are of limited flexibility and have limited clamping ability. In addition, over-center clamps require that they be of fairly precision design to ensure proper functioning.

Custom fixtures require design adaptation for specific workpieces, thereby increasing their cost. In addition, it is necessary to change custom fixtures when the workpieces at a machining center are changed from one kind to another.

Among the objects of the invention is the provision of apparatus which overcomes or substantially minimizes the objectionable characteristics referred to above.

SUMMARY OF THE INVENTION

Apparatus constructed in accordance with preferred embodiments of the invention include a base on which one or a plurality of workpiece supports may be mounted and fitted in place at a machining center of conventional construction and operation so that the workpiece or workpieces supported by the apparatus can be machined as necessary. The apparatus constructed in accordance with the invention can accommodate not only the conventional workpiece supports, but also enables a variety of different kinds of workpiece supports to be utilized, as well as enabling a single type of workpiece support to be used with workpieces of considerably different sizes and types.

The base on which the workpiece supports are mounted preferably is provided with a source of pressure fluid and fluid passages and controls by means of which a plurality of workpieces associated with the respective supports simultaneously and selectively may be clamped and unclamped.

Each workpiece support preferably enables an expandable jaw collet to be used for clamping a workpiece, and also enables a workpiece to be clamped by either upwardly or downwardly directed forces.

In the preferred embodiments a workpiece may be clamped in a position to extend vertically, horizontally, or inclined to the vertical or horizontal. This capability provides uncommon versatility in the types of workpieces that may be used with the apparatus of the invention.

THE DRAWINGS

The preferred embodiments of the invention are illustrated in the accompanying drawings wherein:

FIG. 2 is a partly elevational and partly sectional view illustrating two different kinds of workpiece supports;

FIG. 3 is an enlarged sectional view illustrating one of the supports shown in FIG. 2 in exploded form;

DETAILED DESCRIPTION

Figure 1:
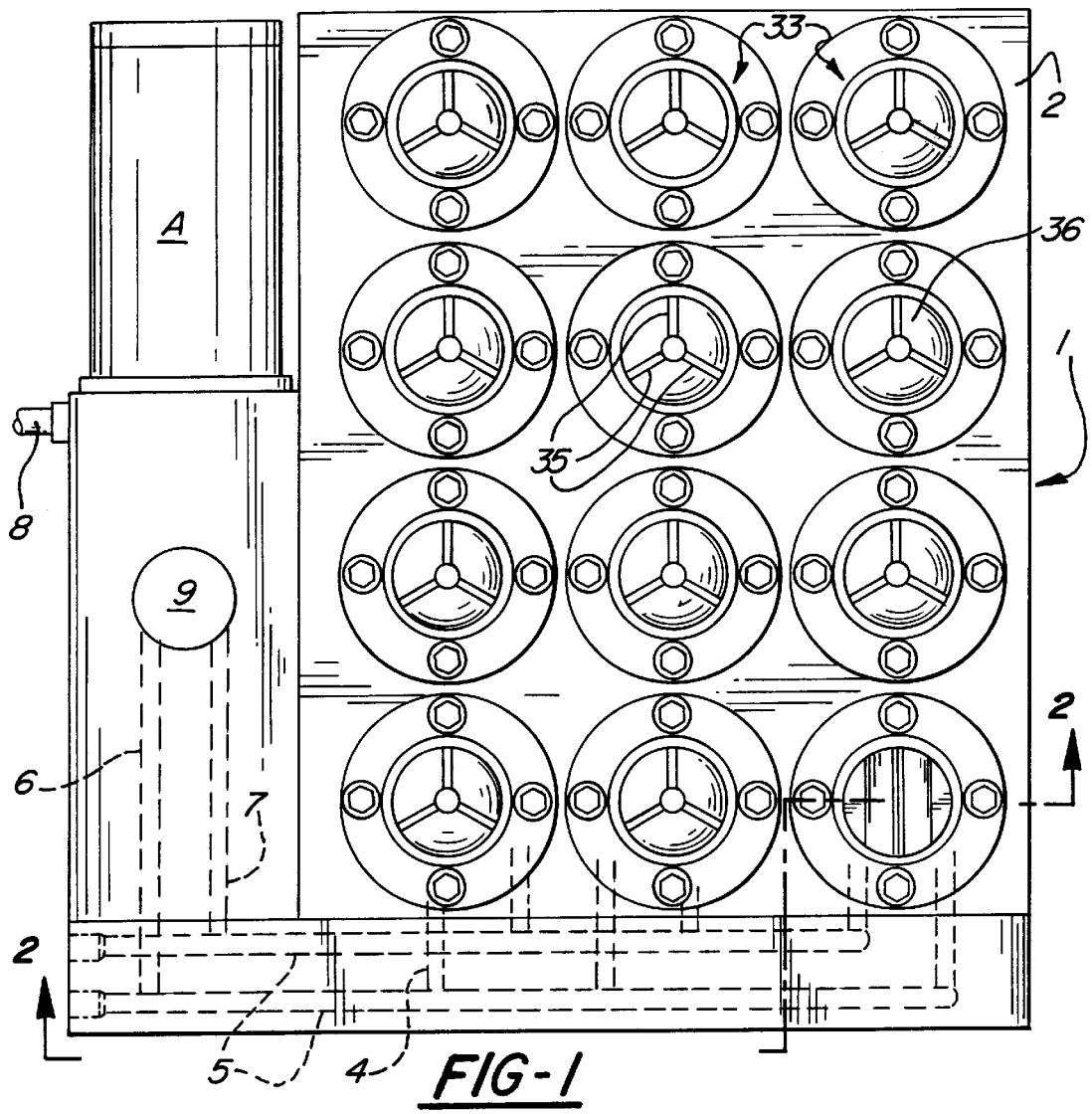
FIG. 1 is a top plan view of a base provided with a plurality of workpiece supports.

Apparatus constructed in accordance with the invention comprises a base 1 comprising a manifold block 2 formed of steel or other suitable material having a plurality of cavities 3 at spaced apart intervals. Each cavity is in communication via appropriate fluid passages 4, 5, 6, and 7 with a source 8 of pressure fluid which may be pumped by a pump (not shown) through the passages via a reversing valve 9 in a conventional manner. The pressure fluid system also includes an accumulator A, as is conventional. The fluid passages also communicate with other passages 10 and 11 in a cylinder 13 (FIG. 3) associated with each cavity 3. Each cylinder 13 has a bore 14 open at one end and partially closed at the opposite end by a wall 15 having a passage 16 therein. A drive piston 17 has a stem 18 which extends through the passage 16. At its opposite end the piston has an enlargement 19 the diameter of which corresponds substantially to that of the cylinder bore 14. The open end of the cylinder 13 is closed by a cap 20.

The passage 16 communicates with a passage 21 which, in turn, communicates with an enlarged bore 22 in the base 2. A coupling or adapter 23 is reciprocably accommodated in the bore 22 and that end 24 of the coupling which confronts the piston 17 is threaded or otherwise suitably connected to the piston. The opposite end 25 of the coupling is both interiorly and exteriorly threaded for purposes presently to be explained.

Each workpiece support includes a tubular member or sleeve 26 having a cylindrical wall 27 defining a bore 28 of such size as freely to accommodate the adjacent end of the coupling 23. One end of the sleeve 26 has an enlargement 29 adapted to rest upon the upper surface of the base 2 and be secured thereto by a locking collar 30 and bolts 31.

When the parts thus far described are assembled, they will occupy the positions shown at the right hand side of FIG. 2 wherein each drive piston 17 occupies a bore 14 and is threadedly connected to the coupling 23, and the sleeve 26 is mounted on and secured to the base 2 so that the sleeve extends beyond the surface of the base.

The sleeve 26 is adapted to accommodate any selected one of a number of workpiece engagable components. One of these components is a conventional, tubular collet 33 having a cylindrical wall 34 interiorly threaded at one end for connection to the exteriorly threaded end 25 of the coupling 23. For a portion of its length the wall 34 is provided with three axially extending slots 35 equally circumferentially spaced forming resilient jaws, as is conventional. That end 36 of the collet opposite the threaded end is outwardly inclined as at 37 for engagement with a complementally tapered inner surface 38 at the free end of the sleeve 26 so that, in response to movement of the collet 33 axially of the sleeve 26, the slots 35 will enable the jaws to grip and release a workpiece accommodated between the jaws depending, of course, upon the direction of movement of the collet relative to the sleeve 26.

Another workpiece support also is illustrated in FIG. 2 at 40 and has a cylindrical stem 41 at one end which is exteriorly threaded for connection to the coupling 23. The opposite end of the support 40 is enlarged and traversed by a V-shaped workpiece bearing surface 42 which, in the embodiment disclosed, is concave upwardly.

The support 40 is reciprocable in the bore 28 of the sleeve 26 and the workpiece bearing surface 42 is so arranged as to bear against and support a workpiece extending longitudinally of the bearing surface 42 and through two diametrally opposite openings 43 (FIG. 3) in the wall 27 of the sleeve 26. It is preferred that each opening 43 taper both upwardly and downwardly axially of the sleeve 26 thereby enabling those edges of the wall defining the tapered openings to clamp a workpiece extending through such openings at either end thereof.

The member 40 disclosed in FIG. 2 has a second workpiece engaging surface formed by a cylindrical bore 45, the longitudinal axis of which is normal to the bearing surface 42. The bore 45 should be of such diameter as to accommodate a workpiece of selected diameter. The diameter of such workpiece cannot be larger than that of the bore, but can be less than that of the bore. The bore 45 forms a bearing surface which is concave upwardly or downwardly, depending on whether the lower or upper surface of the bore engages the workpiece.

Figures 4, 5:
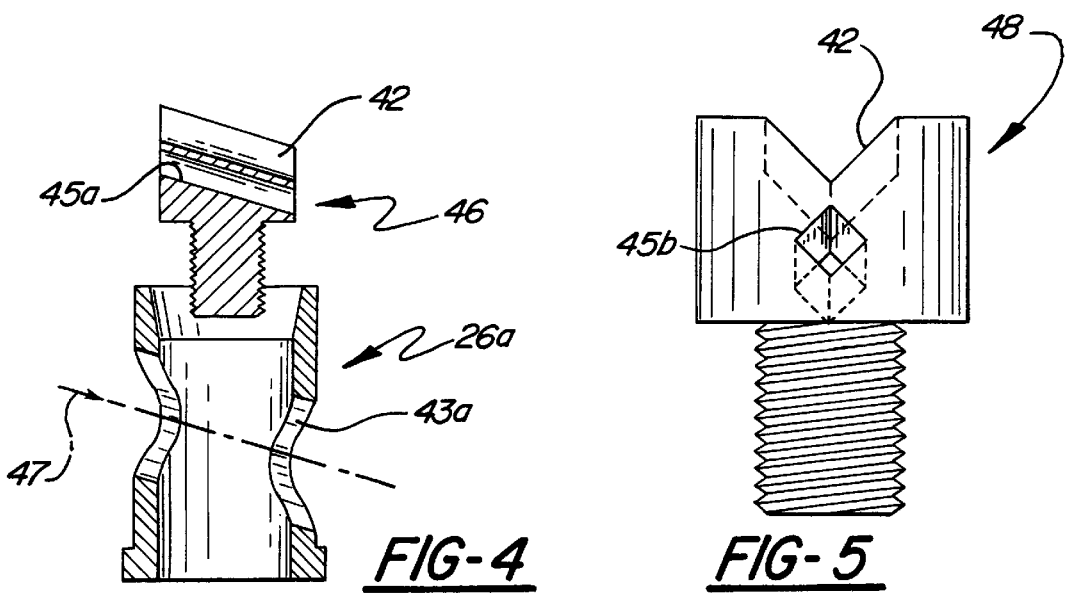
FIG. 4 is an enlarged, sectional view of a modified part of the apparatus.
FIG. 5 is a side elevational view of a further modification.

FIG. 4 illustrates a somewhat modified embodiment of a workpiece support 46 which corresponds substantially to the workpiece support 40 except that the surface 42*a* and the bore 45*a* are inclined to the horizontal. In this embodiment the sleeve 26*a* corresponds to the sleeve 26 except that the openings 43*a* occupy different levels with respect to that of the base so that a diametral line 47 extending through the centers of the openings 43*a* parallels the longitudinal axis of the bore 45*a*.

The workpiece support 48 shown in FIG. 5 differs from the supports 40 and 46 in that the workpiece accommodating opening 45*b* is rectangular, rather than cylindrical. The opening 45*b* thus provides two V-shaped bearing surfaces, one of which is concave downwardly and the other which is concave upwardly.

Although the bearing surfaces 42 shown in FIGS. 4 and 5 parallel the openings 45*a* and 45*b*, they could be horizontal or normal to the axis of reciprocation of the drive piston 17.

When the parts are assembled in such manner as to utilize the collet 33, the latter will be accommodated in a selected sleeve 26 and threadedly connected to the coupling 23. Reciprocation of the collet 33 via the drive piston 17 and the coupling 23 will enable the collet jaws to grip and release a workpiece extending through the collet bore, depending upon the direction in which the collet is moved relative to the sleeve 27.

When it is desired to use the workpiece support 40, the collet 33 is removed and the workpiece support 40 placed in the sleeve 26 and connected to the coupling 23. The V-shaped bearing surface 42 should be so oriented with respect to the sleeve that a workpiece extending through the aligned openings 43 of the sleeve will be accommodated in the bearing surface 42. Upward movement of the driving piston 17 thus will cause the workpiece to be clamped between the bearing surface 42 and the sleeve wall 27 at the upper end of the openings 43. Movement of the driving piston in the opposite direction will unclamp the workpiece and enable it to be removed from the support.

The support 46 may be used in those instances in which a downward force applies a clamping force of the workpiece. In this event it may be necessary to extend the length of the coupling 23 to position the bore 45 at the proper level above that of the base.

If the workpiece support 46 is used instead of the support 40, the workpiece may extend through the bore 45*a* and through the openings 43*a* so as to occupy a position which is inclined to the axis of reciprocation of the support 46. In this embodiment the workpiece bearing surface provided by the cylindrical bore 45*a* can clamp the workpiece against the sleeve 26*a* at either the upper of the lower ends of the openings 43*a*. That is, the bearing surface can be considered to be either concave upwardly or concave downwardly.

The workpiece support 48 shown in FIG. 5 is similar to the workpiece support 40, but the bore 45*b* is rectangular or square, rather than cylindrical. This construction enables the bearing surface formed by the walls of the bore 45*b* to act on the workpiece in such manner as to clamp it either at the upper or lower ends of the openings 43*a* in the sleeve. The bore 45*b* can be either normal to the axis of reciprocation of the workpiece support or inclined thereto.

The construction is such that any of the workpiece supports can be used, and all of the supports mounted on the base at any one time may be the same or different. Further, in those instances in which workpieces are supported by supports of the kind shown at 40, 46, or 48, a number of such supports may be used in combination with one another to support a single workpiece.

The disclosure is representative of presently preferred embodiments of the invention, but is intended to be illustrative rather than definitive thereof. The invention is defined in the claims.

I claim:

1. Apparatus for releasably clamping a workpiece comprising a base; a sleeve having a longitudinal axis mounted on said base; a pair of workpiece supports either selected one of which may be accommodated within said sleeve for reciprocating movements relative to said sleeve along said axis; and reciprocable drive means coupled to said selected one of said supports for effecting conjoint reciprocation of said selected one of said supports along said axis, said sleeve having diametrally opposed openings through which said workpiece may extend and at least one of said supports having a bearing surface engagable with a workpiece extending through said openings and operable releasably to clamp said articles against said sleeve.

2. Apparatus according to claim 1 wherein said sleeve is rotatable relative to said base.

3. Apparatus according to claim 1 wherein the openings in said sleeve are at the same level relative to said base.

4. Apparatus according to claim 1 wherein the openings in said sleeve are at different levels relative to said base.

5. Apparatus according to claim 4 wherein said bearing surface is inclined relative to said base to correspond to the difference in the levels of said openings.

6. Apparatus according to claim 1 wherein said bearing surface is V-shaped.

7. Apparatus according to claim 6 wherein said bearing surface is concave in a direction toward said base.

8. Apparatus according to claim 6 wherein said bearing surface is concave in a direction away from said base.

9. Apparatus according to claim 1 wherein said bearing surface is arcuate.

10. Apparatus according to claim 9 wherein said bearing surface is formed by a cylindrical bore.

11. Apparatus according to claim 10 wherein said bore is substantially normal to said axis.

12. Apparatus according to claim 10 wherein said bore is inclined to said axis.

13. Apparatus for releasably clamping a workpiece comprising a base; a tubular support having a cylindrical wall and being mounted on and extending beyond said base, said tubular support having a longitudinal axis; a second support accommodated within said tubular support for movements along said axis; and reciprocable drive means coupled to said second support for effecting reciprocation of said second support relative to said tubular support along said axis, the cylindrical wall of said tubular support having diametrally opposed openings therein for the accommodation of said workpiece, said second support having a bearing surface engageable with a workpiece extending through said openings, said drive means being operable to move said second support in a direction to enable said bearing surface to seat upon said workpiece and clamp said workpiece between said bearing surface and the wall of said tubular support.

14. Apparatus according to claim 13 wherein said tubular support is rotatable relative to said base about said axis and including means for fixing said tubular support against rotation relative to said base.

15. Apparatus according to claim 13 wherein each of said openings tapers in a direction towards said base.

16. Apparatus according to claim 13 wherein each of said openings tapers in a direction away from said base.

17. Apparatus according to claim 13 wherein said bearing surface is V-shaped.

18. Apparatus according to claim 13 wherein said bearing surface is arcuate.

19. Apparatus according to claim 13 wherein said second support has a bore therethrough for the accommodation of said workpiece.

20. Apparatus according to claim 13 wherein one of the openings in said wall of said tubular support is at a level different from that of the other of said openings.

21. Apparatus according to claim 20 wherein the openings in said wall taper in a direction toward said base.

22. Apparatus according to claim 20 wherein the openings in said wall taper in a direction away from said base.

23. Apparatus according to claim 13 wherein said bearing surface is substantially normal to said axis.

24. Apparatus according to claim 13 wherein said bearing surface is inclined to said axis.

25. Apparatus according to claim 13 wherein said bearing surface faces in a direction towards said base.

26. Apparatus according to claim 13 wherein said bearing surface faces in a direction away from said base.

27. Apparatus for releasably clamping a plurality of separate workpieces comprising a base; a corresponding plurality of workpiece supports, each of said supports having a tubular first member carried by said base, a second member accommodated within said first member for reciprocating movements relative thereto along an axis in directions toward and away from said base, and actuating means coupled to said second member for reciprocating the latter along said axis; a source of pressure fluid; and manifold means connecting said source to each of said actuating means for reciprocating all of said actuating means, each of said tubular support having diametrally opposed workpiece accommodating openings therein and each of said second members having a bearing surface clampingly engagable with the workpiece in response to movement of the second member in one direction when such workpiece extends through the openings in the associated tubular first member.

28. Apparatus according to claim 27 wherein the openings in the first support member are at the same level with respect to that of said base and wherein the bearing surface of the second member is substantially normal to said axis.

29. Apparatus according to claim 27 wherein the openings in the support member of at least one of said supports are at different levels from said base and wherein the bearing surface of the second members of the associated first member is inclined to correspond to the difference in said levels of said openings.

30. Apparatus according to claim 27 wherein the bearing surface of said second member is arcuate.

31. Apparatus according to claim 27 wherein the bearing surface of said second member is V-shaped.

* * * * *